US008018899B2

(12) United States Patent
Oh et al.

(10) Patent No.: US 8,018,899 B2
(45) Date of Patent: Sep. 13, 2011

(54) HANDOFF SYSTEM AND METHOD BETWEEN DIFFERENT KINDS OF DEVICES, SIP SERVER AND OPERATIONAL METHOD OF SIP SERVER

(75) Inventors: Se-jong Oh, Yongin-si (KR); Jeong-ho Bang, Suwon-si (KR); Myung-cul Kim, Daejeon (KR); Kyoung-hee Lee, Daejeon (KR)

(73) Assignees: Samsung Electronics Co., Ltd., Suwon-Si (KR); Korea Advanced Institute of Science and Technology (KAIST), Daejeon (KR)

( * ) Notice: Subject to any disclaimer, the term of this patent is extended or adjusted under 35 U.S.C. 154(b) by 1152 days.

(21) Appl. No.: 11/355,173

(22) Filed: Feb. 16, 2006

(65) Prior Publication Data
US 2006/0187943 A1 Aug. 24, 2006

(30) Foreign Application Priority Data
Feb. 18, 2005 (KR) ........................ 10-2005-0013566

(51) Int. Cl.
*H04W 4/00* (2009.01)
(52) U.S. Cl. ........................................................ 370/331
(58) Field of Classification Search .................. 370/331, 370/328; 455/432.1, 432.3, 433, 435.1, 436, 455/437, 442; 709/227, 228, 206
See application file for complete search history.

(56) References Cited

U.S. PATENT DOCUMENTS

| | | | |
|---|---|---|---|
| 6,907,034 B1 * | 6/2005 | Begis ............................ | 370/354 |
| 6,958,994 B2 * | 10/2005 | Zhakov et al. ................ | 370/352 |
| 6,970,445 B2 * | 11/2005 | O'Neill et al. ................ | 370/338 |
| 7,228,414 B2 * | 6/2007 | Smith et al. ................... | 713/162 |
| 7,228,415 B2 * | 6/2007 | Eschbach et al. ............. | 713/162 |
| 7,349,369 B2 * | 3/2008 | Tsirtsis et al. ................ | 370/328 |
| 7,356,567 B2 * | 4/2008 | Odell et al. ................... | 709/206 |
| 7,386,855 B2 * | 6/2008 | Song et al. .................... | 719/310 |
| 7,447,513 B2 * | 11/2008 | Anttila et al. ................. | 455/519 |
| 7,487,248 B2 * | 2/2009 | Moran et al. .................. | 709/227 |
| 7,570,756 B2 * | 8/2009 | Park et al. ..................... | 379/270 |
| 2003/0021264 A1 * | 1/2003 | Zhakov et al. ................ | 370/352 |
| 2003/0086390 A1 * | 5/2003 | Eschbach et al. ............. | 370/329 |
| 2003/0088676 A1 * | 5/2003 | Smith et al. ................... | 709/227 |
| 2003/0088765 A1 * | 5/2003 | Eschbach et al. ............. | 713/150 |
| 2004/0122976 A1 * | 6/2004 | Dutta et al. .................... | 709/245 |
| 2005/0047435 A1 * | 3/2005 | Segal et al. ................... | 370/466 |
| 2005/0114491 A1 * | 5/2005 | Bushmitch et al. ........... | 709/223 |

(Continued)

OTHER PUBLICATIONS

Schulzrinne et al. "Application-Layer Mobility Using SIP", Service Portability and Virtual Customer Environments, 2000 pp. 29-36.

*Primary Examiner* — Salman Ahmed
*Assistant Examiner* — Faiyazkhan Ghafoerkhan
(74) *Attorney, Agent, or Firm* — Sughrue Mion, PLLC (57) ABSTRACT

A handoff system and method between different kinds of devices, an SIP server and an application method of the SIP server applied thereto. The handoff system between different kinds of devices includes a plurality of devices; a SIP server which requests a routing path update when a handoff request signal is input from a source device among the plurality devices, and getting a target device to participate in a current session; and a gateway which updates a predetermined routing path when a request signal for the routing path update is input, and transmitting data to the source device and the target device via the updated routing path.

22 Claims, 4 Drawing Sheets

U.S. PATENT DOCUMENTS

| | | | |
|---|---|---|---|
| 2005/0125543 A1* | 6/2005 | Park et al. ..................... | 709/227 |
| 2005/0130657 A1* | 6/2005 | Creamer et al. ............. | 455/436 |
| 2005/0138128 A1* | 6/2005 | Baniel et al. .................. | 709/206 |
| 2005/0141456 A1* | 6/2005 | Shaheen ....................... | 370/331 |
| 2006/0067300 A1* | 3/2006 | Poustchi et al. ............. | 370/352 |
| 2006/0098624 A1* | 5/2006 | Morgan et al. ................ | 370/352 |
| 2006/0105770 A1* | 5/2006 | Jagadeesan et al. .......... | 455/444 |
| 2006/0212585 A1* | 9/2006 | Eaton et al. ................... | 709/227 |
| 2007/0239798 A1* | 10/2007 | Shringi et al. ................ | 707/201 |

* cited by examiner

HANDOFF SYSTEM AND METHOD BETWEEN DIFFERENT KINDS OF DEVICES, SIP SERVER AND OPERATIONAL METHOD OF SIP SERVER

CROSS-REFERENCE TO RELATED APPLICATIONS

This application claims priority from Korean Patent Application No. 2005-13566 which was filed on Feb. 18, 2005, in the Korean Intellectual Property Office, the entire content of which is incorporated herein by reference.

BACKGROUND OF THE INVENTION

1. Field of the Invention

The present invention relates to a handoff system and method, between different kinds of devices, capable of achieving a seamless handoff between two devices without changing an existing session, and a Session Initiation Protocol (SIP) server and an operational method of the SIP server applied thereto.

2. Description of the Related Art

In recent years, widespread use of the Internet, rapid advances in wireless communication technology, and performance enhancement of mobile communication terminals such as portable computers and Personal Digital Assistants (PDA's) have increased the number of wireless Internet users. In a wireless Internet environment, a mobile communication terminal can be moved at any time and its network access point changed.

In order make wireless Internet communication of a mobile communication terminal possible, equally high quality Internet service should be guaranteed even though the mobile communication terminal moves from a current network area to another network area.

That is, the mobile communication terminal should be provided with seamless communication. To this end, a process called 'handoff' has been introduced. In telecommunications, the term handoff refers to the process of transferring an ongoing call from an access node in a current network area to an access node of another network area.

Based on this handoff function, a handoff between various devices has been proposed to provide a mobile user with the same service regardless of the type of Internet connection, even though the user changes the user's device to a different type of device as the user moves to another location.

For instance, suppose a user would now like to receive the Internet service the user had been previously receiving through a PDA, through a PC. According to a related art regarding handoff between different kinds of devices, the user must input information necessary for a handoff in order to hand off the Internet service from the PDA to the PC, and then request a handoff.

The handoff request made by the user is sent to a SIP server from the PC, and the SIP server requests a handoff of a crossover node. The crossover node then adds a session connection, whereas the PDA separates the session connection, thereby performing a handoff from the PDA to the PC.

In this case, since the user must input the information, such as a user ID, a session ID, a service speed etc., for the handoff, the user cannot request a handoff unless the user knows know the session ID of the other party. Moreover, the user is allowed to request a handoff only when the user can access both devices with the handoff function.

Also, since the crossover node is directly involved in the handoff, it is absolutely necessary for the crossover node to have a session changing function for adding a session connection to the PC and separating a session connection of the PDA.

SUMMARY OF THE INVENTION

It is, therefore, an aspect of the present invention to provide a handoff system and method between various kinds of devices capable of performing a seamless handoff without changing a session by including a target device in the current session, a SIP applied thereto, and an operational method of the SIP server.

Another aspect of the present invention provides a handoff system and method between various kinds of devices capable of performing intentional data delay of a user when a device conducting the handoff is handed over, a SIP applied thereto, and an operational method of the SIP server.

In an aspect of the invention, there is provided a handoff system between different kinds of devices, the system including: a plurality of devices; a SIP server which requests a routing path update when a handoff request signal is input from a source device among the plurality devices, and which gets a target device to participate in a current session; and a gateway for updating a predetermined routing path when a request signal for the routing path update is input, and transmitting data to the source and target devices via the updated routing path.

In an exemplary embodiment, the SIP server receives device information from each of the plurality of devices, and creates a list of available devices for a handoff based on the received device information. If a device information request signal is input from the source device, the SIP server provides the list to the source device. Here, the source device chooses the target device from the list provided by the SIP server, and requests a handoff.

In an exemplary embodiment, if the pause option is included in the handoff request signal, the SIP server maintains a current Real-time Transport Protocol (RTP) traffic flow. The source device stores a transmitted data and provides the data when a data request is made by the SIP server.

Another aspect of the present invention provides a handoff method between different kinds of devices including: if a handoff request signal is input from a source device, updating a predetermined routing path; getting the target device to participate in a current session; and transmitting data to the source and target devices via the updated routing path.

In an exemplary embodiment, the method further includes: receiving device information from each of the plurality of devices, and creating a list of available devices based on the device information. In addition, the method further includes: if a device information request signal is input from the source device, providing the list to the source device. Here, the source device chooses the target device from the provided list, and requests a handoff.

In an exemplary embodiment, the method further includes: if the pause option is included in the handoff request signal, maintaining a current RTP traffic flow. In addition, the method further includes: in the source device, storing the transmitted data, and providing the data to the target device when a request for the data is made.

Still another aspect of the present invention provides a SIP server for use in a handoff system which performs a handoff between different kinds of devices, in which the SIP server includes: a device interface for receiving a handoff request signal from a source device; a gateway interface which transmits a request signal for a routing path update; and a controller, which controls the gateway interface to transmit a request signal for the routing path update when the handoff request signal is received through the device interface, and getting the target device to participate in a current session.

Yet another aspect of the present invention provides an operational method of a SIP server for use in a handoff system which performs a handoff between different kinds of devices, the method including: receiving a handoff request signal from a source device; transmitting an update request signal for a predetermined routing path; and getting the target device to participate in a current session.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE EXEMPLARY EMBODIMENTS

Exemplary embodiments of the present invention will be described herein below with reference to the accompanying drawings.

Figure 1:
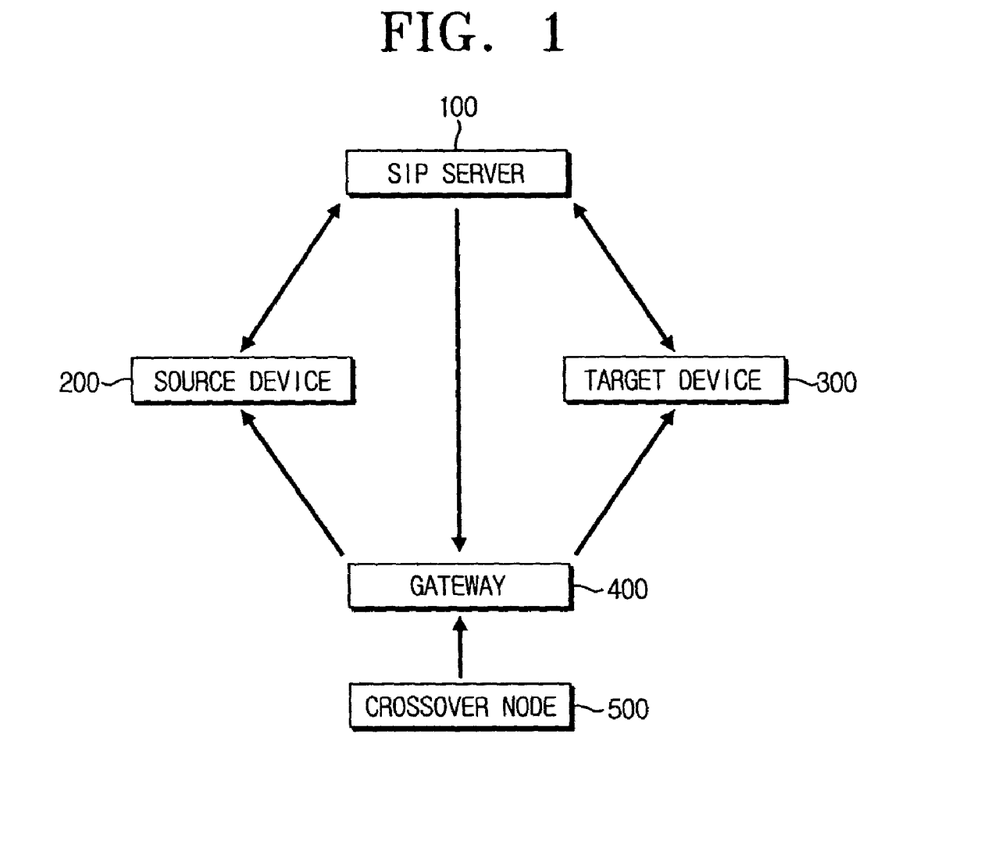
FIG. 1 is a schematic diagram of a handoff system between different kinds of devices, according to an exemplary embodiment of the present invention.

FIG. 1 is a schematic diagram of a handoff system between different kinds of devices, according to an exemplary embodiment of the present invention.

Referring to FIG. 1, the handoff system between different kinds of devices of the present invention includes a SIP server 100, a plurality of devices comprising a source device 200 and a target device 300, a gateway 400, and a crossover node 500.

The plurality of devices comprising the source device 200 and the target device 300 transmit their own device information to the SIP server 100 (to be described later). To do so, the power of each device should be turned on. The device information may include a user ID and a device ID of the device.

Handoff is performed from one device to another device. For convenience, among the plurality of devices, a device which requests a handoff is called a source device 200, and a device which receives the handoff is called a target device 300.

The source device 200 sends a device list request signal to the SIP server 100 to choose a handoff target. When the device list is provided from the SIP server 100, the source device 200 chooses a target device 300, the handoff target, by referring to the device list. After choosing the target device 300, the source device 200 sends a handoff request signal including the ID of the target device to the SIP server 100 to request a handoff.

Most handoffs should be performed without service disconnection. In some cases, however, a handoff may be intentionally delayed by a user. For example, when a user wants to hand off a certain Internet service from a PDA to a PC, the user may need to attend to another (probably urgent) business before proceeding to the handoff. In this case, the source device 200 includes a "pause" option in the handoff request signal at the time of requesting a handoff.

After including the pause option to the handoff request signal, the source device 200 temporarily stores data from the crossover node 500 (to be described later), and transmits the stored data to the SIP server 100 when a request for data transmission is made by the SIP server 100.

As aforementioned, the target device 300 is a handoff target device. During the handoff, it provides a user with data that is received from the crossover node 500. To this end, the target device 300 may send a response message to the session invitation by the SIP server 100.

Typically, SIP is a text-based application-layer control protocol. SIP creates, modifies, and terminates sessions with one or more participants. SIP is designed to be independent of the lower-layer transport protocols, e.g., TCP, UDP, ATM, and X.25.

The SIP server 100 periodically receives device information from each of the plurality of devices, and creates a list of available devices on the basis of the device information. In this manner, the SIP server 100 can manage the status of an individual device. Therefore, when the source device 200 requests the device list, the SIP server 100 provides the device list to the source device 200.

If the source device 200 sends a handoff request signal to the SIP server 100, the SIP server 100 requests the gateway 400 (to be described later) to update a routing path, and gets the target device 300 to participate in the session. More details on the SIP server 100 will be provided in reference to FIG. 2 later.

The gateway 400 transfers the data from the crossover node 500 to the source device 200 and the target device 300. In this embodiment, the gateway 400 updates a predetermined routing path when a routing path update request signal is input from the SIP server 100, and transmits the data from the crossover node 500 to the source device 200 and the target device 300 via the updated routing path.

The crossover node 500 is a node of the service providing side providing desired services through the source device 200 and the target device 300. The crossover node 500 is either a content provider's server providing various contents, or the other party on the picture phone for example.

Figure 2:
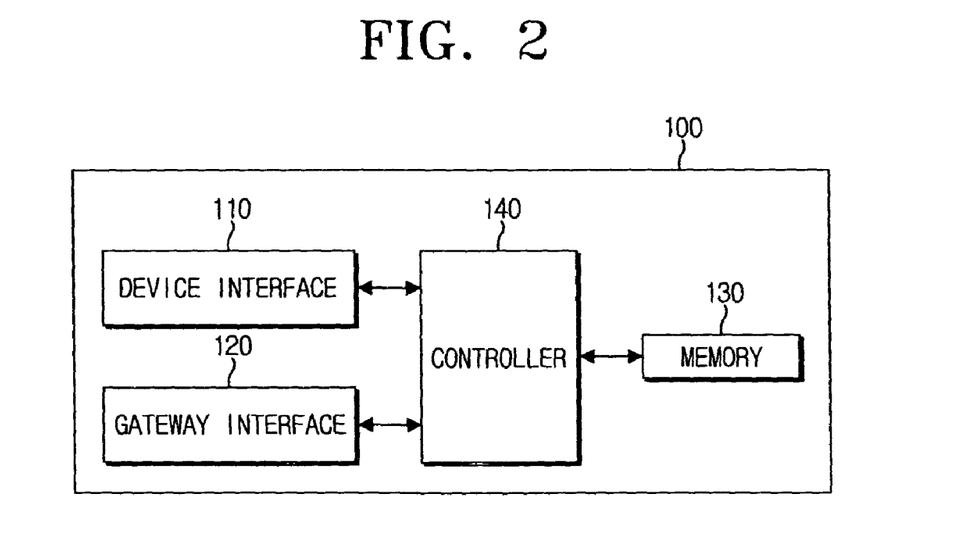
FIG. 2 is a block diagram of a SIP server of FIG. 1.

FIG. 2 is a block diagram of the SIP server illustrated in FIG. 1.

As depicted in FIG. 2, the SIP server 100 according to an exemplary embodiment of the present invention includes a device interface 110, a gateway interface 120, a memory 130, and a controller 140.

The device interface 110 provides an interface between the SIP server 100 and the source device 200/the target device 300. Particularly, the device interface 110 in this exemplary embodiment receives a handoff request signal from the source device 200, and provides the handoff request signal to the controller 140 (to be described later). In addition, the device interface 110 periodically receives device information from each of the plurality of devices, and provides them to the controller 140. Furthermore, the device interface 110 receives a device information request signal from the source device 200, and provides the device information request signal to the controller 140.

The gateway interface 120 provides an interface between the SIP server 100 and the gateway 400, and transmits a request signal for the routing path update to the gateway 400, under the control of the controller 140.

The memory 130 stores a device list established by the controller 140, and provides the list upon a request of the controller 140.

When a handoff request signal is input through the device interface 110, the controller 140 controls the gateway interface 120 to transmit a request signal for a routing path update, and gets the target device to participate in the session.

When device information on the plurality of devices are input through the device interface 110, the controller creates a list of available devices based on the received device information, and controls the memory 130 to store the device list.

When the source device 200 sends a device information request signal through the device interface 110, the controller 140 controls the device interface 110 to provide the device list stored in the memory 130 to the source device 200.

If a "pause" option is included in a handoff request signal, which is transmitted from the source device 200 through the device interface 110, the controller 140 maintains a current RTP traffic flow.

In this case, when a data transmission request signal is input from the target device 300 through the device interface 110, the controller 140 receives data from the source device and provides the data to the target device 300.

Figure 3:
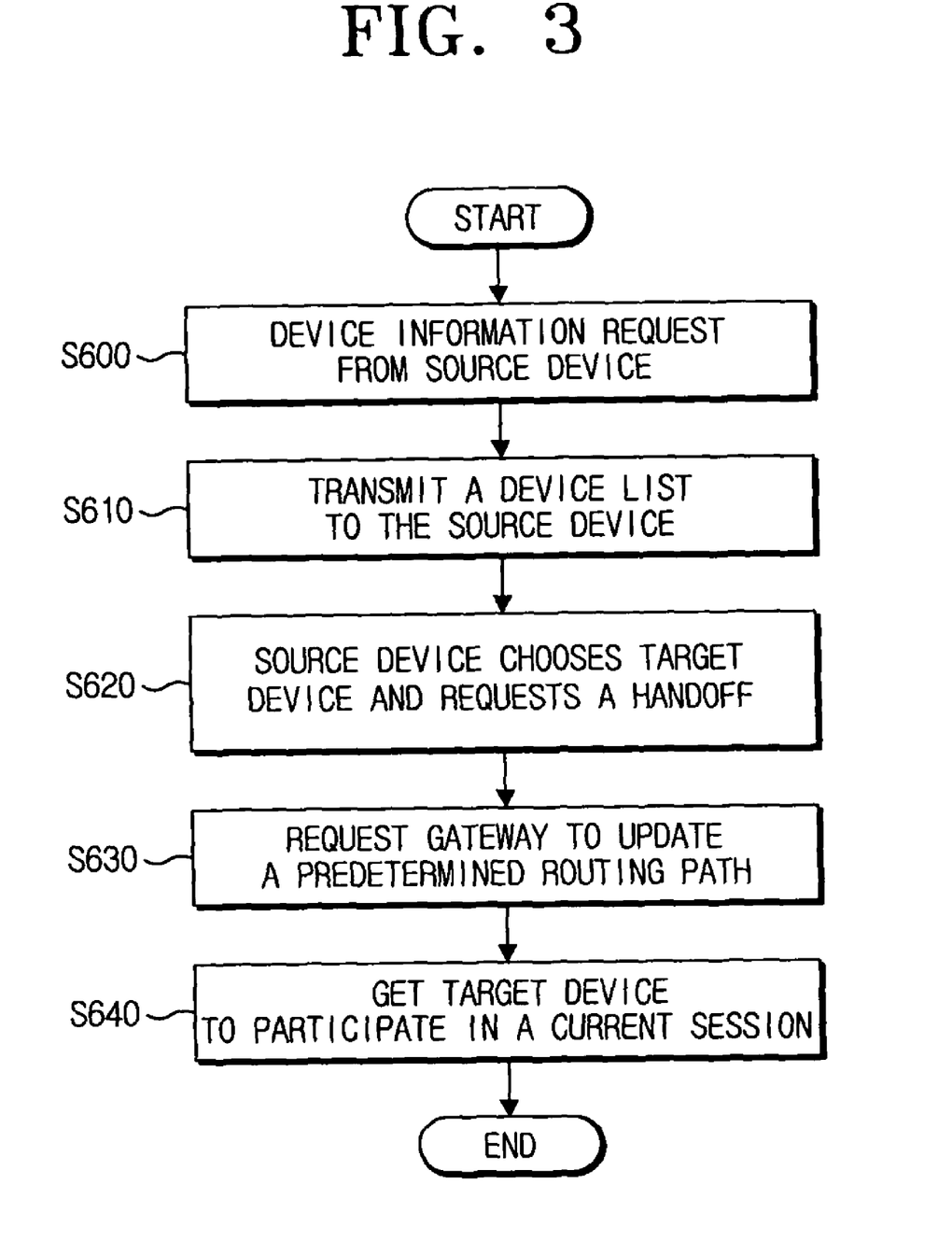
FIG. 3 is a flow chart explaining an operational method of a SIP server according to an exemplary embodiment of the present invention.

FIG. 3 is a flow chart explaining an operational method of the SIP server according to an exemplary embodiment of the present invention. For the operational method described below, the handoff system shown in FIGS. 1 and 2 will be referred.

First, the source device 200 requests the SIP server 100 to provide device information in order to choose a handoff target. Then, a device information request signal is input to the controller 140 through the device interface 110 (S600).

The controller 140 controls the device interface 110 to transmit the pre-stored device list, the device list being prepared based on the periodically received device information from the devices and stored in the memory 130 in advance, to the source device 200 (S610).

Upon receiving the device list from the SIP server 100, the source device 200 chooses the target device 300 from the device list, transmits a handoff request signal including the ID of the target device 300 to the SIP server 100, and requests a handoff (S620).

When the handoff request signal is input through the device interface 110, the controller 140 controls the gateway interface 120 to transmit a request signal for a routing path update to the gateway 400 (S630). Later, the controller 140 gets the target device 300 chosen by the source device 200 to participate in the current session (S640).

Figure 4:
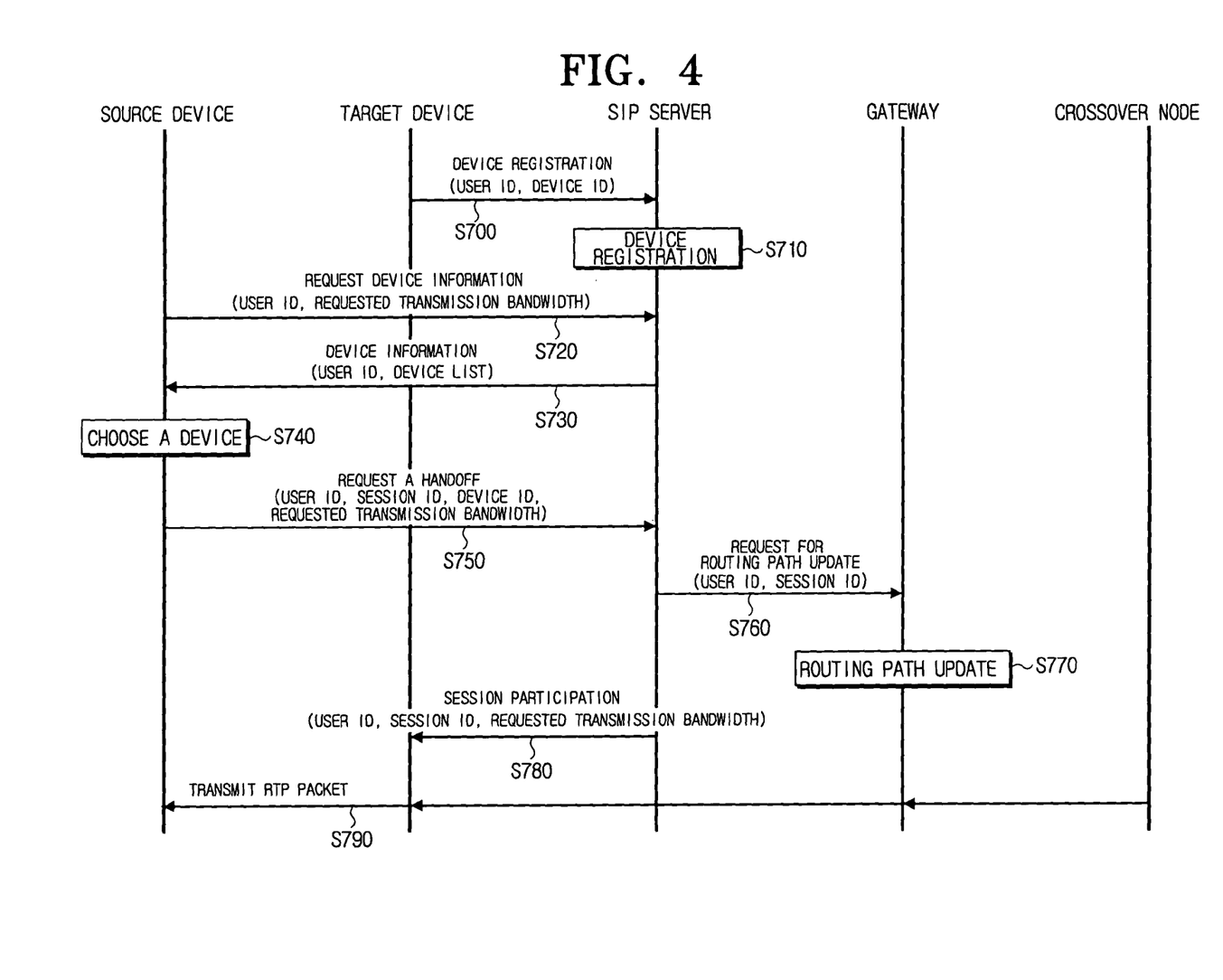
FIG. 4 is a flow chart explaining a handoff method between different kinds of devices, according to an exemplary embodiment of the present invention.

FIG. 4 is a flow chart explaining a handoff method between different kinds of devices, according to an exemplary embodiment of the present invention. Again, for the handoff method described below, the handoff system shown in FIGS. 1 and 2 will be referred.

First, a plurality of devices periodically transmit their own device information for registration to the SIP server 100 (S700). Here, the device information includes a user ID and a device ID. Although FIG. 4 shows that only the target device 300 transmits its device information and is registered, this is for illustrative purposes only, and the present invention is not limited thereby.

The SIP server 100 receives the device information from the devices and registers the devices. Using the device information, the SIP server 100 creates a device list and stores the list in the memory 130 (S710).

If the source device 200 wants to choose a handoff target, it sends a device information request signal to the SIP server 100 (S720). Here, the device information request signal may include a user ID and a requested transmission bandwidth.

The controller 140 of the SIP server 100 transmits the device information to the source device 200 through the device interface 110 (S730). Here, the device information includes a user ID and the device list.

The source device 200 chooses the target device 300 as the handoff target from the device list the SIP server 100 has provided (S740), and transmits a handoff request signal to the SIP server 100 (S750). Here, the handoff request signal may include a user ID, a session ID, an ID of the target device 300, and a requested transmission bandwidth.

When the handoff request signal from the source device 200 is input through the device interface 110, the controller 140 of the SIP server 100 transmits a request signal for a routing path update to the gateway 400 through the gateway interface 120 (S760). Here, the routing path update request signal may include a user ID and a session ID.

Upon receiving the routing path update request signal from the SIP server 100, the gateway 400 updates a predetermined routing path (S770).

Later, the controller 140 of the SIP server 100 gets the target device 300 to participate in the session (S780). In an exemplary embodiment, the SIP server 100 sends a signal for inviting the target device 300 to the session, and the target device 300 responds thereto. Here, the signal for an invitation to the session may include a user ID, a session ID and a transmission requested bandwidth.

If the target device 300 participates in the session according to the above-described procedure, the crossover node 500 transmits data to the gateway 400, and the gateway 400 transmits the data to the source device 200 and the target device 300 via the updated path (S790). At this time, the data can be in form of an RTP packet.

Figure 5:
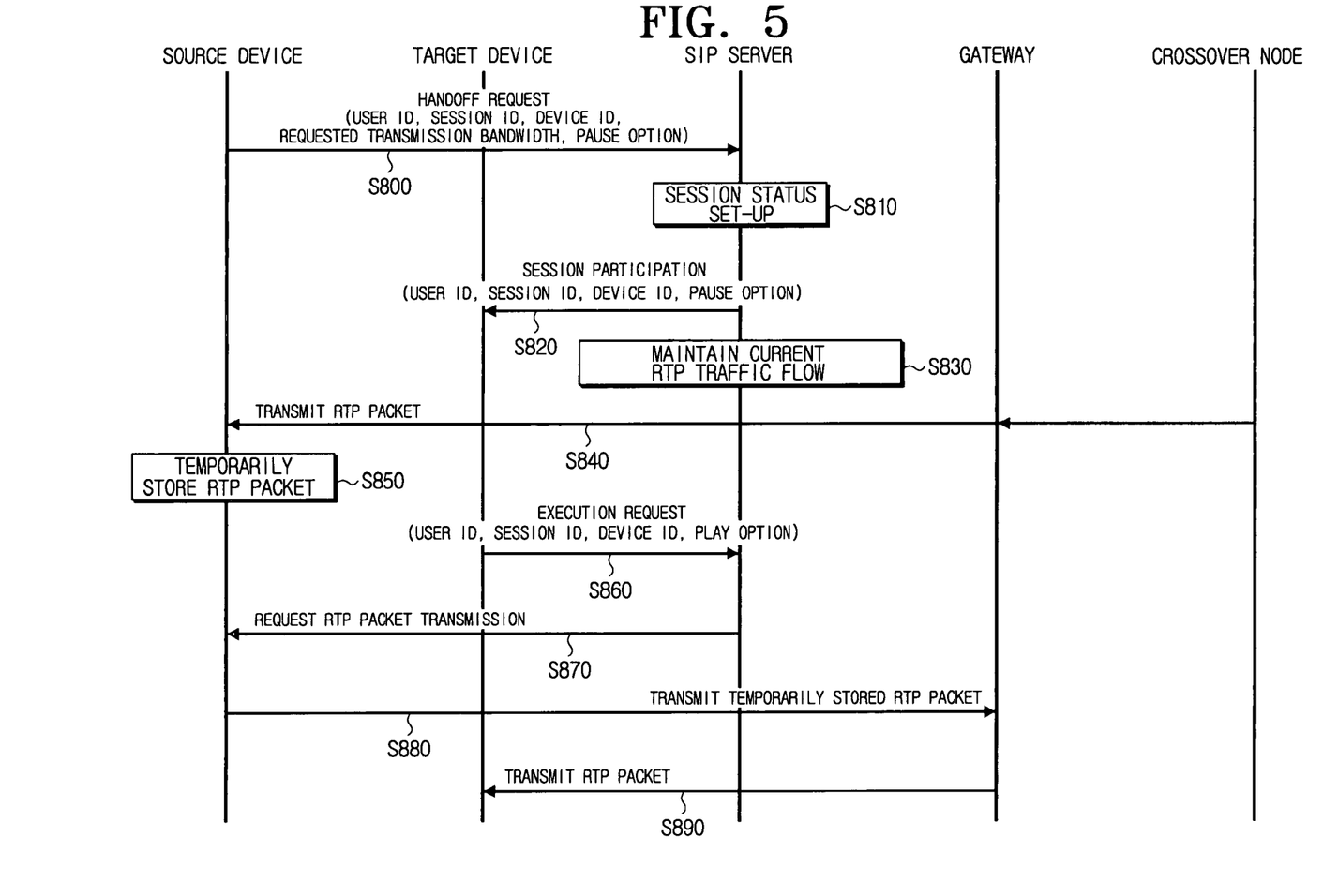
FIG. 5 is a flow chart explaining a handoff method between different kinds of devices, according to another exemplary embodiment of the present invention.

FIG. 5 is a flow chart explaining a handoff method between different kinds of devices, according to another exemplary embodiment of the present invention.

Particularly, in this exemplary embodiment, the handoff performed between different kinds of devices can be intentionally delayed by a user. Since operations S700 to S740 in FIG. 4 are equally applied to this case, they will not be explained repeatedly.

The source device 200 requests a handoff of the SIP server 100 (S800). Here, the handoff request signal may include a user ID, a session ID, device ID, a requested transmission bandwidth, and additionally a "pause" option.

Upon receiving the handoff request signal including the pause option from the source device 200, the SIP server 100 sets the session status to 'pause' mode (S810), and gets the target device 300 to participate in the session (S820). At this time, a signal transmitted from the SIP server 100 to the target device 300 may include a user ID, a session ID, a device ID and the pause option.

After making the target device 300 participate in the session, the controller 140 of the SIP server 100 maintains the existing RTP traffic current (S830).

The crossover node 500 transmits data to the gateway 400, and the gateway transmits the data received from the crossover node 500 to the source device 200 (S840). Here, the data is in the form of an RTP packet.

The source device 200 temporarily stores the data, i.e., the RTP packet, transmitted from the gateway 400 (S850).

When a user is ready to receive the data, the user transmits an execution request signal to the SIP server 100 using the target device 300 (S860). Here, the execution request signal includes a user ID, a session ID, a device ID, and additionally a "play" option.

The controller 140 of the SIP server 100 requests the source device 200 through the device interface 110 to transmit the RTP packet (S870). Then, the source device 200 transmits the RTP packet, which has been provided from the gateway 400 and has been temporarily stored in the source device 200, back to the gateway 400 (S880). At a later time, the gateway 400 transmits the RTP packet from the source device 200 to the target device 300 (S890).

In this manner, the user is able to set the pause option when the user issues a handoff request through the source device 200, and receive the existing service continuously at a desired time.

As explained so far, according to the handoff system and method between different kinds of devices, the SIP server and the application method of the SIP server of the present invention, the SIP server is able to perform a seamless handoff without changing the session by making the handoff target chosen by the user participate in the current session. Moreover, without having the user change locations or manipulate the handoff target in person, the handoff can be performed simply by operating the source device.

As the pause option can be set at the time of a handoff request, the user is now able to delay the handoff if necessary. In such a case, data is temporarily stored and is provided later when the user is ready. That is to say, the user can receive the real-time service continuously, despite the intentional delay.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A handoff system between different kinds of wireless devices, the system comprising:
    a plurality of wireless devices comprising a source device and a target device;
    a Session Initiation Protocol (SIP) server which requests a routing path update when a handoff request signal is input from the source device, and which gets the target device to participate in a current session; and
    a gateway which updates a predetermined routing path when a request signal for the routing path update is input, and transmits data to the source device and the target device via the updated routing path,
    wherein when the handoff request signal is input, performing handoff by transferring the current session from an access node in a first network area to an access node of a second network area, wherein if a pause option is included in the handoff request signal, the SIP server maintains a current Real-time Transport Protocol (RTP) traffic flow with the source device and the target device.

2. The handoff system according to claim 1, wherein the SIP server receives device information from each of the plurality of wireless devices, and creates a list of available devices for a handoff based on the received device information.

3. The handoff system according to claim 2, wherein if a device information request signal is input from the source device, the SIP server provides the list to the source device.

4. The handoff system according to claim 3, wherein the source device selects the target device from the list provided by the SIP server, and requests a handoff.

5. The handoff system according to claim 1, wherein the source device stores a transmitted data received from the gateway, and provides the transmitted data to the gateway when a data request is made by the SIP server.

6. The handoff system according to claim 1, wherein the request signal for the routing path update comprises a user ID and a session ID.

7. A handoff method between different kinds of wireless devices in a handoff system which performs a handoff from a source device to a target device among a plurality of devices, the method comprising:
    if a handoff request signal is input from the source device, updating a predetermined routing path;
    getting the target device to participate in a current session; and
    transmitting data to the source device and the target device via the updated routing path,
    wherein when the handoff request signal is input, performing handoff by transferring the current session from an access node in a first network area to an access node of a second network area, wherein if a pause option is included in the handoff request signal, maintaining, by an SIP server, a current RTP traffic flow with the source device and the target device.

8. The method according to claim 7, further comprising:
    receiving device information from each of the plurality of devices, and creating a list of available devices based on the received device information.

9. The method according to claim 8, further comprising:
    if a device information request signal is input from the source device, providing the list to the source device.

10. The method according to claim 9, wherein the source device selects the target device from the provided list and requests a handoff.

11. The method according to claim 7, further comprising:
    in the source device, storing the transmitted data, and providing the transmitted data to the target device when a request for the transmitted data is made.

12. The method according to claim 7, wherein the pause option is a delay of the handoff which is set by a user.

13. A Session Initiation Protocol (SIP) server used in a handoff system which performs a handoff between a source device and a target device among a plurality of different kinds of wireless devices, the SIP server comprising:
    a device interface which receives a handoff request signal from the source device;
    a gateway interface which transmits a request signal for a routing path update; and
    a controller, which controls the gateway interface to transmit a request signal for the routing path update when the handoff request signal is received through the device interface, and gets the target device to participate in a current session,
    wherein when the handoff request signal is input, performing handoff by transferring the current session from an access node in a first network area to an access node of a second network area, wherein if a pause option is included in the handoff request signal, the controller maintains a current RTP traffic flow with the source device and the target device.

14. The SIP server according to claim 13, wherein the device interface periodically receives device information from each of the plurality of wireless devices.

15. The SIP server according to claim 13, wherein the controller creates a list of available devices for a handoff based on the device information received.

16. The SIP server according to claim 15, further comprising:
    a memory which stores the list of available devices.

17. The SIP server according to claim 15, wherein if a device information request signal is input from the source device, the controller controls the device interface to provide the list to the source device.

18. The SIP server according to claim 13, wherein if a data transmission request signal is input from the target device, the controller obtains data from the source device and provides the data to the target device.

19. An operational method of a Session Initiation Protocol (SIP) server used in a handoff system which performs a handoff between a source device and a target device among a plurality of different kinds of wireless devices, the method comprising:
  receiving a handoff request signal from the source device;
  transmitting an update request signal for a predetermined routing path; and
  getting the target device to participate in a current session,
  wherein when the handoff request signal is input, performing handoff by transferring the current session from an access node in a first network area to an access node of a second network area, if a pause option is included in the received handoff request signal, maintaining, by the SIP server, a current RTP traffic flow with the source device and the target device.

20. The method according to claim 19, further comprising:
  periodically receiving device information from each of the plurality of wireless devices and generating a list of available devices based on the received device information for a handoff.

21. The method according to claim 20, further comprising:
  if a device information request signal is input from the source device, providing the list to the source device.

22. The method according to claim 19, further comprising:
  if a data transmission request signal is input from the target device, obtaining data from the source device and providing the data to the target device.

* * * * *